United States Patent [19]

Beach et al.

[11] 4,328,123

[45] May 4, 1982

[54] OLEFIN POLYMERIZATION CATALYST

[75] Inventors: David L. Beach, Gibsonia, Pa.; Adolfo Zambelli, Milan, Italy

[73] Assignee: Gulf Research & Development Company, Pittsburgh, Pa.

[21] Appl. No.: 221,200

[22] Filed: Dec. 29, 1980

[51] Int. Cl.$^3$ .............................. C08F 4/64; C08F 4/02
[52] U.S. Cl. ................................. 252/429 B; 526/125
[58] Field of Search .................................... 252/429 B

[56] References Cited

U.S. PATENT DOCUMENTS

| | | | |
|---|---|---|---|
| 4,104,198 | 8/1978 | May, Jr. et al. | 252/429 B |
| 4,163,831 | 8/1979 | Gessell | 526/153 |
| 4,186,107 | 1/1980 | Wagner | 252/429 B |

FOREIGN PATENT DOCUMENTS 2643143  6/1977  Fed. Rep. of Germany.

*Primary Examiner*—Patrick Garvin

*Attorney, Agent, or Firm*—Deane E. Keith; Forrest D. Stine; Joseph J. Carducci

[57] ABSTRACT

A novel catalyst composition is provided which comprises the reaction product of (A) an aluminum hydrocarbyl treated with an electron donor compound and (B) a support containing chlorine, bromine and magnesium, wherein the molar ratio of bromine to chlorine ranges between about 1:99 to about 50:50, preferably between about 2.5:97.5 to about 20:80, and most preferably between about 2.5:97.5 to about 15:85, obtained by reacting an organo magnesium compound with a mixture of chlorinated and brominated aluminum compounds, the support having been additionally treated with an electron donor compound and with titanium tetrachloride. The molar ratio of magnesium to combined chlorine and bromine in the support is not critical but generally ranges between about 1:1.6 and about 1:2.0, preferably between about 1:1.8 and about 1:2.0.

58 Claims, No Drawings

OLEFIN POLYMERIZATION CATALYST

CROSS-REFERENCE TO RELATED APPLICATIONS

Reference is made to applicant's following U.S. applications:

U.S. Patent application Ser. No. 221,064, filed Dec. 29, 1980, entitled "Composition Containing Chlorine, Bromine and Magnesium".

U.S. Patent application Ser. No. 221,063, filed Dec. 29, 1980, entitled "Process for the Preparation of Aluminum Trihydrocarbyls".

U.S. Patent application Ser. No. 220,447, filed Dec. 29, 1980, entitled "Process for the Polymerization of Olefins."

FIELD OF THE INVENTION

The present invention relates to a novel catalyst composition. More particularly, this invention relates to a catalyst composition utilizing a support containing magnesium, chlorine and bromine obtained by reacting an organo magnesium compound with a mixture of chlorinated and brominated aluminum compounds.

DESCRIPTION OF THE PRIOR ART

It is well known in the art to use metallic catalysts to polymerize olefins such as ethylene, propylene, 1-butene and the like to form polymers of high molecular weight. One such general class of metallic catalyst are the "Ziegler-Natta" types consisting of aluminum alkyls or alkyl halides and titanium halides. Such catalysts polymerize olefins in a stereospecific manner resulting in the formation of olefin polymers which are characterized by high degrees of isotacticity and crystallinity. U.S. Pat. No. 4,104,198 to May, Jr., et al discloses the reaction of ethyl aluminum sesquichloride with di(n-butyl)magnesium to form a precipitate, the treatment of a slurry of this precipitate with a solution containing 480 ppm Ti and tri-n-decyl aluminum to form a catalyst, and the use of this catalyst to polymerize ethylene. U.S. Pat. No. 4,163,831 to Gessell discloses the preparation of an olefin polymerization catalyst by reacting an organomagnesium compound with a metal halide such as an aluminum trihalide to form a finely divided intermediate reaction product and thereafter mixing the intermediate reaction product with a titanium compound. German Pat. No. 2643143 to Luciani et al discloses the preparation of an olefin polymerization catalyst by reacting (a) an organometallic aluminum compound devoid of halogen atoms directly linked to the aluminum atom, (b) an electron donor compound and (c) a solid comonent which is the reaction product of a halogenated magnesium compound with a tetravalent titanium compound and with an electron donor compound.

SUMMARY OF THE INVENTION

A novel catalyst composition has now been found which comprises the reaction product of (A) an aluminum hydrocarbyl treated with an electron donor compound and (B) a support containing chlorine, bromine and magnesium, wherein the molar ratio of bromine to chlorine ranges between about 1:99 to about 50:50, preferably between about 2.5:97.5 to about 20:80, and most preferably between about 2.5:97.5 to about 15:85, obtained by reacting an organo magnesium compound with a mixture of chlorinated and brominated aluminum compounds, the support having been additionally treated with an electron donor compound and with titanium tetrachloride. The molar ratio of magnesium to combined chlorine and bromine in the support is not critical but generally ranges between about 1:1.6 and about 1:2.0, preferably between about 1:1.8 and about 1:2.0.

When the catalyst of this invention is used in the polymerization of olefins as hereinafter described, there are obtained high polymer yields and a high degree of isotacticity in the polymer product.

DESCRIPTION OF THE PREFERRED EMBODIMENTS

A support for use in the preparation of the catalyst composition of this invention is prepared by reacting an organo magnesium compound with a mixture of chlorinated and brominated aluminum compounds. The term "organo magnesium compound" is intended to include divalent hydrocarbyl magnesium compounds wherein the hydrocarbyl portion thereof can be saturated or unsaturated, straight or branched chain alkyl radicals having from about one to about 24 carbon atoms, preferably from about one to about 10 carbon atoms; aryl radicals having from about six to about 20 carbon atoms, preferably from about six to about 10 carbon atoms; alkenyl radicals having from about one to about 30 carbon atoms, preferably from about one to about 20 carbon atoms; cycloalkyl radicals having from about three to about 40 carbon atoms, preferably from about three to about 30 carbon atoms; and aralkyl and alkaryl radicals having from abut six to about 40 carbon atoms, preferably from about six to about 30 carbon atoms. The organo magnesium compound can be defined by the following formula:

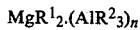

$$MgR^1{}_2 \cdot (AlR^2{}_3)_n$$

wherein n is an integer having a value of 0 or higher than 0 and preferably has a value of from 0 to 4, and each of $R^1$ and $R^2$ can be a hydrocarbyl radical as previously defined.

Specific examples of organo magnesium compounds that can be used include: diethylmagnesium, di-n-propylmagnesium, di-iso-propylmagnesium, di-n-butylmagnesium, di-sec-butylmagnesium, di-iso-butylmagnesium, di-hexylmagnesium, ethylbutylmagnesium, n-butyl-sec-butylmagnesium, diphenylmagnesium, dibenzylmagnesium, ditolylmagnesium, dicyclohexylmagnesium, magnesium aluminum pentaethyl, magnesium dialuminum, octaethyl, magnesium aluminum diethyltriisobutyl, magnesium aluminum dibutyl hexaethyl, magnesium dialuminum diphenyl hexaethyl, magnesium dialuminum dibenzyl hexaethyl, magnesium dialuminum dicyclohexyl hexaethyl, magnesium dialuminum diethyl hexabutyl, etc. Of these the following organo magnesium compounds are preferred: diethylmagnesium, the dibutylmagnesiums, magnesium dialuminum octaethyl, magnesium aluminum pentaethyl, magnesium dialuminum diethyl hexa-iso-butyl and magnesium dialuminum di-iso-butyl hexaethyl.

The chlorinated and brominated aluminum compounds that can be reacted with the organo magnesium compounds defined above can be defined by the following formula:

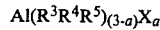

$$Al(R^3R^4R^5)_{(3-a)}X_a$$

wherein each of $R^3$, $R^4$ and $R^5$ can be a hydrocarbyl radical as defined above, X is chlorine or bromine, and a is an integer from 1 to 3. Specific examples of chlorinated and brominated aluminum compounds that can be used include: aluminum trichloride, aluminum ethyl dichloride, aluminum diethyl monochloride, aluminum isobutyl dichloride, aluminum di-isobutyl monochloride, aluminum diphenyl monochloride, aluminum dibenzyl monochloride, ethyl aluminum sesquichloride, aluminum n-butyl dichloride, aluminum di-n-butyl monochloride, aluminum sec-butyl dichloride, aluminum di-sec-butyl monochloride, aluminum propyl dichloride, aluminum dipropyl monochloride, etc. and the corresponding bromides. Of these the following chlorinated and brominated aluminum compounds are preferred: aluminum ethyl dichloride, aluminum diethyl monochloride, ethyl aluminum sesquichloride, aluminum dibutyl monochloride, aluminum butyl dichloride, etc. and the corresponding bromides, and aluminum tribromide.

In the reaction of the organo magnesium compounds with the chlorinated and brominated aluminum compounds, the molar ratios thereof can vary greatly as long as the molar ratios of chlorine and bromine in the final support will fall within the ranges previously defined above. For example, magnesium, chlorine and bromine can be employed in the reaction mixture in the molar range of about 1.0:1.0:0.02 to about 1.0:10.0:5.0, respectively.

In carrying out the reaction it is desirable to do so in the presence of an inert liquid diluent, preferably a hydrocarbon diluent, such as benzene, toluene, cyclohexane, heptane, etc. The amount of diluent used can vary over a wide range, but generally will be such that the resultant slurry will contain from about 70 to about 99 weight percent, preferably from about 90 to about 98 weight percent, of diluent based on the total weight of the slurry.

The reaction is simply effected by stirring the slurry and maintaining the temperature thereof in the range of about $-20°$ to about $180°$ C., preferably about $25°$ to about $110°$ C., for about one minute to about 24 hours, preferably about one to about eight hours under any suitable inert atmosphere, such as nitrogen. The pressure, similarly, is not critical and ambient pressure is preferred, although pressures as low as about 25 millimeters of mercury or as high as about 100 pounds per square inch gauge (690 kPa), or even higher, can be used if desired.

The reaction mixture is then brought to ambient conditions of temperature and pressure and filtered. The recovered solids are then washed with a suitable hydrocarbon solvent, such as defined above, at ambient conditions, or in a temperature range of about $25°$ to about $100°$ C., until all the hydrocarbon-soluble constituents are removed therefrom. The solids are then dried to remove residual hydrocarbon therefrom. All of this is carried out in a suitable inert atmosphere. The solids so obtained contain substantially solely chlorine, bromine and magnesium suitable for use as the catalyst support.

The reactions described above can be exemplified by the following representative ideal equations:

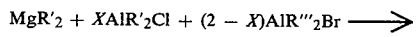 (1)

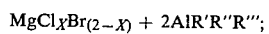

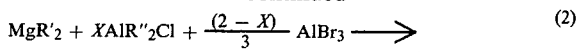 (2)

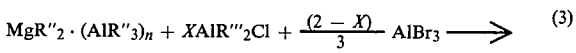 (3)

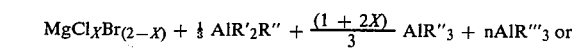

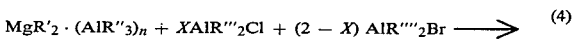 (4)

wherein each of R', R'', R''', and R'''' can be hydrocarbyl radical as previously defined, X can range from about 1.0 to about 1.98, preferably from about 1.6 to about 1.95, and most preferably from about 1.7 to about 1.95, and n is as previously defined.

In the reaction the aluminum compounds are removed from the process in the filtrate and by washing the solid residue after filtration with a hydrocarbon. The aluminum hydrocarbyls prepared jointly with the magnesium halide supports can be recovered and used to treat the support for the subsequent polymerization of olefins as described hereinafter. The recovery of the desired aluminum hydrocarbyls can be effected in any conventional manner, for example, by subjecting the filtrate to distillation at a temperature within the range of about $50°$ to about $150°$ C. and a pressure of about 25 millimeters of mercury to about 760 millimeters of mercury to remove the solvent therefrom.

The magnesium halide support thus obtained will have a surface area of about 80 to about 250 square meters per gram, generally about 150 to about 200 square meters per gram. The support is then treated with any suitable electron donor compound (or Lewis base). Some examples of electron donor compounds which can be used are amines, amides, ethers, ketones, nitriles, phosphines, stibenes, arsines, phosphoramides, thioethers, thioesters, aldehydes, alcoholates, amides and salts of organic acids with metals of the groups I to IV of the periodic system of elements. Suitable organic acids include aromatic acids, as for example benzoic acid or p-hydroxybenzoic acid. Some examples of typical electron donor compounds include triethylamine, N,N'-dimethylpiperazine, diethylether, n-dibutyl ether, tetrahydrofuran, acetone, acetophenone, benzonitrile, tetramethyl urea, nitrobenzene, Libutylate, dimethylaminophenyl lithium and Na-dimethylamide. Preferred electron donor compounds include esters of acids containing organic and inorganic oxygen and ethers, such as n-dibutyl ether. Some of the most suitable esters are the alkyl esters of aromatic acids, such as benzoic acid, p-methoxy- or p-ethoxybenzoic acid and p-tolyl acid, e.g., ethyl benzoate, ethyl-p-methoxybenzoate, methyl-p-toluate and ethyl-p-butoxybenzoate. Further examples of suitable esters include diethylcarbonate, triethylborate, ethylpivalate, ethylnaphthoate, ethyl-o-chlorobenzoate, ethylacetate, dimethylmaleate, alkyl- or arylsilicate and methylmethacrylate. Treatment with the electron donor compound can be accomplished, for example, by suspending the magnesium-chloride bromide support in the electron donor compound, alone or in the presence of an inert liquid hydrocarbon carrier, such as defined above, so that the support will constitute, for example, from about 10 to about 50 weight percent of the resultant slurry. The slurry can be stirred, under an inert atmosphere, as defined above, for about 10 minutes to about six hours, or even longer, preferably for about 0.5 to about four hours, at a temperature of about 25° to about 150° C., preferably about 50° to about 100° C., after which the slurry is filtered and the recovered solids are dried under a vacuum. The dried solids are then mixed with titanium tetrachloride and the mixture can be heated, for example, for about 10 minutes to about six hours, preferably for about 0.5 to about four hours, at a temperature of about 50° to about 150° C., preferably about 80° to about 140° C. The resulting mixture is then filtered, preferably while warm, and the recovered solids are then washed with a hydrocarbon solvent, such as defined above, to remove hydrocarbon soluble material therefrom. The amount of titanium tetrachloride used is that amount that will result in a recovered solid product containing from about 0.03 to about three weight percent, preferably from about 0.7 to about 2.0 weight percent of titanium, calculated as elemental titanium. All of this is done in an inert atmosphere, as before.

The magnesium-chloride-bromide support which has been treated with an electron donor compound and with titanium tetrachloride is then reacted with an aluminum hydrocarbyl which has been treated with an electron donor compound. The aluminum hydrocarbyl can be defined by the following formula:

wherein each of $R^6$, $R^7$ and $R^8$ are hydrocarbyl radicals, as previously defined. Especially preferred aluminum hydrocarbyls for such use are triethylaluminum, tri-n-propylaluminum, tri-iso-propylaluminum, tri-n-butylaluminum and tri-iso-butylaluminum. As previously mentioned, the aluminum hydrocarbyls prepared jointly with the magnesium halide support may be used in this step. The aluminum hydrocarbyl prior to use in the polymerization catalyst is contacted with an electron donor compound, such as defined above. The molar ratio of the aluminum hydrocarbyl to the electron donor compound can be, for example, in the range of about 0.1:1 to about 10:1, preferably about 0.5:1 to about 4:1. The treatment can be effected following the conditions outlined above in the treatment of the magnesium-chloride bromide support with the electron donor compound. The treated aluminum hydrocarbyl is then reacted with the support such that the molar ratio of the aluminum hydrocarbyl to the titanium compound is in the range of about 0.1:1 to about 10:1, preferably about 0.5:1 to about 4:1. This can be accomplished by suspending the support, which has been treated with an electron donor compound and with titanium tetrachloride as previously described, in a solution containing the aluminum hydrocarbyl and the electron donor compound.

The resulting catalyst composition can be used to polymerize alpha olefins, preferably alpha olefins having at least three carbon atoms and most preferably alpha olefins containing from three to 10 carbon atoms. Examples include propylene, 1-butene, 4-methyl-1-pentene, 1-hexene, 1-octene, 1-decene, and the like. Copolymers of such alpha olefins with each other or with ethylene can also be obtained. The alpha olefin and catalyst are contacted with each other in a polymerization reactor at a temperature of about 25° to about 150° C., preferably about 40° to about 80° C., for about one-half to about five hours, preferably for about one to about three hours using a pressure that can range from about ambient to about 1200 pounds per square inch gauge (8274 kPa), preferably in the range of about 40 to about 600 pounds per square inch gauge (276 to 4137 kPa). The catalyst is preferably in suspension in a non-reactive hydrocarbon solvent, e.g., pentane, hexane, heptane, cyclopentane, cyclohexane, benzene, toluene, xylene, etc.

At the end of the polymerization period, the pressure is released, and the reaction product is filtered, washed with a solvent, such as isopropanol, and the solid polymers are recovered and then dried. The isotacticity of the polymers resulting from the polymerization process defined above will be in excess of about 90 percent and will generally be in the range of about 97 to about 99 percent. The polymer yield using the defined catalyst will be in excess of about 55,000 grams per gram of titanium in the catalyst, generally will be in the range of about 65,000 to about 200,000, or even higher, grams of polymer per gram of titanium. The polymer particle diameter will be such that substantially all (above 99 percent) will have a particle diameter in excess of 90 microns. This means they can easily be handled and will be less susceptible to atmospheric oxidation.

The following examples illustrate the invention, and are not intended to limit the invention, but rather, are presented for purposes of illustration.

EXAMPLE I

Into a three-necked flask provided with a stirrer, dropping funnel and reflux condenser there was poured a Solution A which had been prepared by dissolving 0.18 mole of $MgAl_2(C_2H_5)_8$ in 500 milliliters of an anhydrous n-heptane. A Solution B prepared by dissolving 0.24 mole of $AlC_2H_5Cl_2$ in 100 milliliters of anhydrous n-heptane was added to Solution A while stirring at room temperature, resulting in the immediate formation of a white Precipitate C. The reaction mixture was stirred while its temperature was raised to the boiling point of the solvent. At the end of six hours the flask was cooled to room temperature and the Precipitate C was recovered by filtration, washed with anhydrous n-heptane and dried under vacuum Seventeen grams of insoluble Precipitate C were recovered having a surface area of 150 m²/gram and was found to contain 24.2 weight percent magnesium, 0.6 weight percent aluminum and 65.3 weight percent chlorine.

Precipitate C (1.1 grams) was suspended in a solution consisting of four milliliters of anhydrous n-heptane and one milliliter of ethylbenzoate and the suspension was heated, while stirring, to 70° C. and maintained at such temperature for four hours. The mixture was filtered and the recovered solids were washed with 10 milliliters of n-heptane and dried. To the solids there were added 10 milliliters of $TiCl_4$ and the temperature of the resulting mixture was raised to the boiling point (about 140° C.) while stirring. After three hours the temperature was lowered to 100° C., the excess $TiCl_4$ was removed from the mixture by filtration and the recovered Insoluble Material D was washed three times with anhydrous n-heptane and dried under vacuum. The Insoluble Material D (1.27 grams) was found to contain 18.9 weight percent magnesium, 0.65 weight percent aluminum, 1.4 weight percent titanium and 53.8 weight percent chlorine.

Insoluble Material D (0.1 gram) was suspended in a solution containing 500 milliliters of anhydrous n-heptane, 0.6 milliliters of $Al(C_2H_5)_3$ and 0.3 milliliters of ethyl anisate. The suspension was transferred under vacuum into a one-liter autoclave, thermostatted at 50° C. and propylene was then fed to the reactor, while the contents were stirred, until a pressure of 90 pounds per square inch (621 kPa) was reached. This pressure was maintained for one hour, after which propylene feed was discontinued, the autoclave was cooled to room temperature and the unreacted propylene was vented. The contents of the autoclave were poured into two liters of isopropanol and, after filtration and drying, 45 grams of isotactic polypropylene were recovered. There were obtained from the polymerization slurry 32,143 grams of propylene polymer per gram of titanium in the catalyst. Ninety-six percent of the polymer was found to be insoluble in boiling n-heptane. The intrinsic viscosity [n] (in tetralin at 135° C.) was equal to 3.9 deciliters/gram. All of the reactions, escept for recovery of the polymer, were performed in a nitrogen atmosphere.

EXAMPLE II

The procedure of Example I was followed except that Solution A consisted of 0.04 mole of $MgAl_2(C_2H_5)_6(C_4H_9)_2$ dissolved in 200 milliliters of anhydrous n-heptane, Solution B consisted of 0.12 mole of $Al(C_2H_5)_2Cl$ in 70 milliliters of anhydrous n-heptane and Precipitate C was treated for two hours with a solution of 0.3 milliliter of ethyl benzoate and five milliliters of n-heptane at boiling temperature (about 98° C.) for two hours and dried under vacuum without washing before the treatment with $TiCl_4$. Starting with one gram of Precipitate C, 0.95 gram of Insoluble Material D was recovered which was found to contain 20.3 weight percent magnesium, 0.36 weight percent aluminum, 1.0 weight percent titanium and 57 weight percent chlorine. The polymer yield in this run was 53 grams, with 53,000 grams of polypropylene being obtained per gram of titanium. The intrinsic viscosity of the polymer was 4.3 deciliters per gram and 95 percent was insoluble in boiling n-heptane.

EXAMPLE III

The same procedure as in the following Example IV was followed except that Solution A contained 0.03 mole of $Mg(C_4H_9)_2$ and Solution B contained 0.058 mole of $Al(C_2H_5)_2Cl$ and 0.0005 mole of $AlBr_3$. There were recovered three grams of Precipitate C. Insoluble Material D (0.97 gram) was prepared starting with one gram of Precipitate C. In the polymerization 62 grams of polypropylene were obtained. The intrinsic viscosity of the polymer was 4.9 deciliters per gram and 98 percent was insoluble in boiling n-heptane.

EXAMPLE IV

The same procedure was used as in Example II except that Solution A contained 0.03 mole of $MgAl_2(C_2H_5)_8$ in 150 milliliters of n-heptane and Solution B contained 0.056 mole of $Al(C_2H_5)_2Cl$ and 0.002 mole of $AlBr_3$ in 50 milliliters of n-heptane. There were recovered three grams of Precipitate C which was found to contain 20 weight percent magnesium, 0.1 weight percent aluminum, 47.3 weight percent chlorine and 13.1 weight percent bromine. Insoluble Material D (0.84 gram) was recovered starting with 0.95 gram of Precipitate C. Insoluble Material D was found to contain 20.7 weight percent magnesium, 0.05 weight percent aluminum, 0.8 weight percent titanium, 9.7 weight percent bromine and 53.2 weight percent chlorine. The polymer yield amounted to 90 grams. There were obtained 112,500 grams of polypropylene polymer per gram of titanium. The intrinsic viscosity was 3.7 deciliters per gram and 97 percent was insoluble in boiling n-heptane.

EXAMPLE V

The same procedure was used as in Example IV except that Solution A contained 0.03 mole of $Mg(C_4H_9)_2$ instead of $MgAl_2(C_2H_5)_8$. There were recovered 3.18 grams of Precipitate C which was found to contain 20 weight percent magnesium, 0.4 weight percent aluminum, 13 weight percent bromine and 51.7 weight percent chlorine. Insoluble Material D (0.96 gram) was obtained starting with one gram of Precipitate C. It was found to contain 18.4 weight percent magnesium, 0.1 weight percent aluminum, 1.5 weight percent titanium and 56.4 weight percent chlorine. There were recovered 100 grams of polypropylene polymer. This amounted to 66,667 grams of polymer per gram of titanium in the catalyst. The intrinsic viscosity of the polymer was 3.8 deciliters per gram and 97 percent was insoluble in boiling n-heptane.

EXAMPLE VI

The procedure of Example IV was followed except that Solution A contained 0.03 mole of $Mg(C_4H_9)_2$ and Solution B contained 0.049 mole of $Al(C_2H_5)_2Cl$, 0.004 mole of $AlBr_3$ and 0.037 mole of $Al(C_2H_5)_3$. Precipitate C (3.7 grams) was recovered. Insoluble Material D (0.93 gram) was obtained starting with 0.93 gram of Precipitate C. The polypropylene obtained amounted to 55 grams. The intrinsic viscosity of the polymer was 4.4 deciliters per gram and 98 percent was insoluble in boiling n-heptane.

EXAMPLE VII

The procedure of Example IV was again followed except that Solution A contained 0.03 mole of $MgAl_2(C_2H_5)_6(C_4H_9)_2$ and Solution B contained 0.03 mole of $Al(C_2H_5)_2Cl$ and 0.016 mole of $AlC_2H_5Br_2$. Precipitate C (4.2 grams) was obtained. Starting with one gram of Precipitate C there was recovered 0.74 gram of Insoluble Material D, which was found to contain 18.6 weight percent magnesium, 0.12 weight percent aluminum, 1.5 weight percent titanium, 17.9 weight percent bromine and 44.8 weight percent chlorine. There were recovered 45 grams of polypropylene. This amounted to 30,000 grams of polymer per gram of titanium. The intrinsic viscosity of the polymer was 3.8 deciliters per gram and 95 percent was insoluble in boiling heptane.

EXAMPLE VIII

In this example the procedure of Example II was followed except that Solution A contained 0.045 mole of $MgAl_2(C_2H_5)_8$ and Solution B contained 0.045 mole of $Al(C_2H_5)_2Br$ dissolved in 50 milliliters of n-heptane. There were recovered 4.3 grams of Precipitate C which was found to contain 12.8 weight percent magnesium, 0.36 weight percent aluminum and 80.5 weight percent bromine. Two grams of Precipitate C were used to obtain 1.7 grams of Insoluble Material D which was found to contain 12.65 weight percent magnesium, 0.1 weight percent aluminum, 1.0 weight percent titanium, 58.4 weight percent bromine and 11.0 weight percent chlorine. The polymer yield was 45 grams. There were obtained 45,000 grams of polypropylene polymer per gram of titanium. The intrinsic viscosity was 3.0 deciliters per gram and 89.0 percent of the polymer was insoluble in boiling n-heptane.

The data above are tabulated below in Table I.

| Example | Support Molar Ratio, Br:Cl | Support Molar Ratio, Magnesium to Combined Cl and Br | Polymer Yield, Grams Polymer Per Gram of Total Catalyst | Polymer Yield, Grams Polymer Per Gram of Titanium | Isotacticity Weight Percent* | Intrinsic Viscosity, Deciliters Per Gram (ASTM D-2857) |
|---|---|---|---|---|---|---|
| I | 0:100 | 1:1.84 | 450 | 32,143 | 96 | 3.9 |
| II | 0:100 | Not taken | 530 | 53,000 | 95 | 4.3 |
| III | 3:97 | Not taken | 620 | Not taken | 98 | 4.9 |
| IV | 12:88 | 1:1.82 | 900 | 112,500 | 97 | 3.7 |
| V | 11:89 | 1:1.98 | 1000 | 66,667 | 97 | 3.8 |
| VI | 24:76 | Not taken | 550 | Not taken | 98 | 4.4 |
| VII | 52:48 | Not taken | 450 | 30,000 | 95 | 3.8 |
| VIII | 100:00 | 1:1.90 | 450 | 45,000 | 89 | 3.0 |

*Weight of polymer insoluble in boiling n-heptane

In the above table it can be seen that the results obtained using the supports of Examples III to VI are far better than when chlorine is the only halogen in the support (Examples I and II) or when bromine is the only halogen in the support (Example VIII) or when the molar ratio of bromine to chlorine is outside the critical ratio (Example VII).

That it is critical that the magnesium-chloride bromide catalyst support be obtained by reacting an organo magnesium compound with a mixture of chlorinated and brominated aluminum compound is apparent from the following.

EXAMPLE IX

The procedure of Example IV was followed, except the Precipitate C (the halogenated magnesium compound) was obtained by disproportionating an intimate mixture containing 0.007 mole (0.93 gram) of $MgC_2H_5Br$ and 0.08 mole (7.10 gram) of $MgC_2H_5Cl$ with $Al(C_2H_5)_3$ according to the general procedure described by K. Ziegler and E. Holzkamp in Ann. Chem., 605 (1957) 93. The resulting product was washed with anhydrous n-heptane and dried in vacuuo. One gram of Insoluble Material D was prepared starting with one gram of Precipitate C. The elemental analysis of Insoluble Material D was as follows: 18.7 weight percent magnesium, 0.05 weight percent aluminum, 1.3 weight percent titanium, 6.6 weight percent bromine and 53.9 weight percent chlorine. The molar ratio of bromine to chlorine was 5:95. The amount of polymer obtained was 15 grams. This amounted to 11,538 grams of polypropylene per gram of titanium. The intrinsic viscosity of the polymer was 3.5 deciliters per gram and only 87 percent was found to be insoluble in hot n-heptane.

Although the invention has been described in considerable detail with particular reference to certain preferred embodiments thereof, variations and modifications can be effected within the spirit and scope of the invention as described hereinbefore, and as defined in the appended claims.

We claim:

1. A novel catalyst composition which comprises the reaction product of (A) an aluminum hydrocarbyl treated with an electron donor compound and (B) a support containing chlorine, bromine and magnesium, wherein the molar ratio of bromine to chlorine ranges between about 1:99 to about 50:50, obtained by reacting an organo magnesium compound with a mixture of chlorinated and brominated aluminum compounds, said support having been additionally treated with an electron donor compound and with titanium tetrachloride.

2. A composition as defined in claim 1 wherein the molar ratio of magnesium to combined chlorine and bromine in said support ranges between about 1:1.6 to about 1:2.0.

3. A composition as defined in claim 1 wherein said organo magnesium compound is a divalent hydrocarbyl magnesium compound wherein the hydrocarbyl portion thereof is a radical selected from the group consisting of alkyl radicals having from about one to about 24 carbon atoms, aryl radicals having from about six to about 20 carbon atoms, alkenyl radicals having from about one to about 30 carbon atoms, cycloalkyl radicals having from about three to about 40 carbon atoms, and aralkyl and alkaryl radicals having from about six to about 40 carbon atoms.

4. A composition as defined in claim 3 wherein said organo magnesium compound is selected from the group consisting of diethylmagnesium, di-n-propylmagnesium, di-iso-propylmagnesium, di-n-butylmagnesium, di-sec-butylmagnesium, di-iso-butylmagnesium, di-hexylmagnesium, ethylbutylmagnesium, n-butyl-sec-butylmagnesium, diphenylmagnesium, dibenzylmagnesium, ditolylmagnesium, dicyclohexylmagnesium, magnesium aluminum pentaethyl, magnesium dialuminum octaethyl, magnesium aluminum diethyltriisobutyl, magnesium aluminum dibutyl hexaethyl, magnesium dialuminum diphenyl, hexaethyl, magnesium dialuminum dibenzyl hexaethyl, magnesium dialuminum dicyclohexyl hexaethyl and magnesium dialuminum diethyl hexabutyl.

5. A composition as defined in claim 1 wherein said chlorinated and brominated aluminum compounds have the formula:

$$Al(R^3R^4R^5)_{(3-a)}X_a,$$

wherein each of $R^3$, $R^4$, and $R^5$ is a hydrocarbyl radical selected from the group consisting of alkyl radicals having from about one to about 24 carbon atoms, aryl radicals having from about six to about 20 carbon atoms, alkenyl radicals having from about one to about 30 carbon atoms, cycloalkyl radicals having from about three to about 40 carbon atoms, and aralkyl and alkaryl radicals having from about six to about 40 carbon atoms, X is chlorine or bromine and a is an integer from 1 to 3.

6. A composition as defined in claim 5 wherein said chlorinated and brominated aluminum compounds are selected from the group consisting of aluminum trichloride, aluminum ethyl dichloride, aluminum diethyl monochloride, aluminum isobutyl dichloride, aluminum di-iso-butyl monochloride, aluminum diphenyl monochloride, aluminum dibenzyl monochloride, ethyl aluminum sesquichloride, aluminum n-butyl dichloride, aluminum di-n-butyl monochloride, aluminum sec-butyl dichloride, aluminum di-sec-butyl monochloride, aluminum propyl dichloride, aluminum dipropyl monochloride, and the corresponding bromides.

7. A composition as defined in claim 1 wherein the molar ratio of bromine to chlorine in said support ranges between about 2.5:97.5 to about 20:80.

8. A composition as defined in claim 1 wherein the molar ratio of bromine to chlorine in said support ranges between about 2.5:97.5 to about 15:85.

9. A composition as defined in claim 2 wherein the molar ratio of bromine to chlorine in said support ranges between about 2.5:97.5 to about 20:80.

10. A composition as defined in claim 2 wherein the molar ratio of bromine to chlorine in said support ranges between about 2.5:97.5 to about 15:85.

11. A composition as defined in claim 4 wherein the molar ratio of bromine to chlorine in said support ranges between about 2.5:97.5 to about 20:80.

12. A composition as defined in claim 4 wherein the molar ratio of bromine to chlorine in said support ranges between about 2.5:97.5 to about 15:85.

13. A composition as defined in claim 6 wherein the molar ratio of bromine to chlorine in said support ranges between about 2.5:97.5 to about 20:80.

14. A composition as defined in claim 6 wherein the molar ratio of bromine to chlorine in said support ranges between about 2.5:97.5 to about 15:85.

15. A composition as defined in claim 1 wherein the molar ratios of magnesium to chlorine to bromine compounds which are combined to obtain said support ranges between about 1.0:1.0:0.2 to about 1.0:10.0:5.0.

16. A composition as defined in claim 2 wherein the molar ratios of magnesium to chlorine to bromine compounds which are combined to obtain said support ranges between about 1.0:1.0:0.2 to about 1.0:10.0:5.0.

17. A composition as defined in claim 4 wherein the molar ratios of magnesium to chlorine to bromine compounds which are combined to obtain said support ranges between about 1.0:1.0:0.2 to about 1.0:10.0:5.0.

18. A composition as defined in claim 6 wherein the molar ratios of magnesium to chlorine to bromine compounds which are combined to obtain said support ranges between about 1.0:1.0:0.2 to about 1.0:10.0:5.0.

19. A composition as defined in claim 1 wherein in obtaining said support said compounds are combined in an inert diluent to form a slurry.

20. A composition as defined in claim 2 wherein in obtaining said support said compounds are combined in an inert diluent to form a slurry.

21. A composition as defined in claim 4 wherein in obtaining said support said compounds are combined in an inert diluent to form a slurry.

22. A composition as defined in claim 6 wherein in obtaining said support said compounds are combined in an inert diluent to form a slurry.

23. A composition as defined in claim 19 wherein said slurry is maintained at a temperature in the range of about −20° C. to about 180° C. for about one minute to about 24 hours.

24. A composition as defined in claim 19 wherein said slurry is maintained at a temperature in the range of about 25° to about 110° C. for about one to about eight hours.

25. A composition as defined in claim 20 wherein said slurry is maintained at a temperature in the range of about −20° C. to about 180° C. for about one minute to about 24 hours.

26. A composition as defined in claim 20 wherein said slurry is maintained at a temperature in the range of about 25° to about 110° C. for about one to about eight hours.

27. A composition as defined in claim 21 wherein said slurry is maintained at a temperature in the range of about −20° C. to about 180° C. for about one minute to about 24 hours.

28. A composition as defined in claim 21 wherein said slurry is maintained at a temperature in the range of about 25° to about 110° C. for about one to about eight hours.

29. A composition as defined in claim 22 wherein said slurry is maintained at a temperature in the range of about −20° C. to about 180° C. for about one minute to about 24 hours.

30. A composition as defined in claim 22 wherein said slurry is maintained at a temperature in the range of about 25° to about 110° C. for about one to about eight hours.

31. A composition as defined in claim 1 wherein said supported is treated with said electron donor compound by suspending it alone or in the presence of an inert liquid hydrocarbon carrier for about 10 minutes to about six hours at a temperature of about 25° to about 150° C.

32. A composition as defined in claim 1 wherein said support is treated with said electron donor compound by suspending it alone or in the presence of an inert liquid hydrocarbon carrier for about 0.5 to about four hours at a temperature of about 50° to about 100° C.

33. A composition as defined in claim 2 wherein said support is treated with said electron donor compound by suspending it alone or in the presence of an inert liquid hydrocarbon carrier for about 10 minutes to about six hours at a temperature of about 25° to about 150° C.

34. A composition as defined in claim 2 wherein said support is treated with said electron donor compound by suspending it alone or in the presence of an inert liquid hydrocarbon carrier for about 0.5 to about four hours at a temperature of about 50° to about 100° C.

35. A composition as defined in claim 4 wherein said support is treated with said electron donor compound by suspending it alone or in the presence of an inert liquid hydrocarbon carrier for about 10 minutes to about six hours at a temperature of about 25° to about 150° C.

36. A composition as defined in claim 4 wherein said support is treated with said electron donor compound by suspending it alone or in the presence of an inert liquid hydrocarbon carrier for about 0.5 to about four hours at a temperature of about 50° to about 100° C.

37. A composition as defined in claim 6 wherein said support is treated with said electron donor compound by suspending it alone or in the presence of an inert liquid hydrocarbon carrier for about 10 minutes to about six hours at a temperature of about 25° to about 150° C.

38. A composition as defined in claim 6 wherein said support is treated with said electron donor compound by suspending it alone or in the presence of an inert liquid hydrocarbon carrier for about 0.5 to about four hours at a temperature of about 50° to about 100° C.

39. A composition as defined in claim 31 wherein said support is thereafter mixed with titanium tetrachloride and heated for about 10 minutes to about six hours at a temperature of about 50° to about 150° C. and a solid product is thereafter recovered containing from about 0.3 to about three weight percent titanium, calculated as elemental titanium.

40. A composition as defined in claim 32 wherein said support is thereafter mixed with titanium tetrachloride and heated for about 0.5 to about four hours at a temperature of about 80° to about 140° C. and a solid product is thereafter recovered containing from about 0.7 to about 2.0 weight percent titanium, calculated as elemental titanium.

41. A composition as defined in claim 33 wherein said support is thereafter mixed with titanium tetrachloride and heated for about 10 minutes to about six hours at a temperature of about 50° to about 150° C. and a solid product is thereafter recovered containing from about 0.3 to about three weight percent titanium, calculated as elemental titanium.

42. A composition as defined in claim 34 wherein said support is thereafter mixed with titanium tetrachloride and heated for about 0.5 to about four hours at a temperature of about 80° to about 140° C. and a solid product is thereafter recovered containing from about 0.7 to about 2.0 weight percent titanium, calculated as elemental titanium.

43. A composition as defined in claim 35 wherein said support is thereafter mixed with titanium tetrachloride and heated for about 10 minutes to about six hours at a temperature of about 50° to about 150° C. and a solid product is thereafter recovered containing from about 0.3 to about three weight percent titanium, calculated as elemental titanium.

44. A composition as defined in claim 36 wherein said support is thereafter mixed with titanium tetrachloride and heated for about 0.5 to about four hours at a temperature of about 80° to about 140° C. and a solid product is thereafter recovered containing from about 0.7 to about 2.0 weight percent titanium, calculated as elemental titanium.

45. A composition as defined in claim 37 wherein said support is thereafter mixed with titanium tetrachloride and heated for about 10 minutes to about six hours at a temperature of about 50° to about 150° C. and a solid product is thereafter recovered containing from about 0.3 to about three weight percent titanium, calculated as elemental titanium.

46. A composition as defined in claim 38 wherein said support is thereafter mixed with titanium tetrachloride and heated for about 0.5 to about four hours at a temperature of about 80° to about 140° C. and a solid product is thereafter recovered containing from about 0.7 to about 2.0 weight percent titanium, calculated as elemental titanium.

47. A composition as defined in claim 1 wherein said aluminum hydrocarbyl is selected from the group consisting of triethylaluminum, tri-n-propylaluminum, tri-iso-propylaluminum, tri-n-butylaluminum and tri-iso-butylaluminum.

48. A composition as defined in claim 2 wherein said aluminum hydrocarbyl is selected from the group consisting of triethylaluminum, tri-n-propylaluminum, tri-iso-propylaluminum, tri-n-butylaluminum and tri-iso-butylaluminum.

49. A composition as defined in claim 4 wherein said aluminum hydrocarbyl is selected from the group consisting of triethylaluminum, tri-n-propylaluminum, tri-iso-propylaluminum, tri-n-butylaluminum and tri-iso-butylaluminum.

50. A composition as defined in claim 6 wherein said aluminum hydrocarbyl is selected from the group consisting of triethylaluminum, tri-n-propylaluminum, tri-iso-propylaluminum, tri-n-butylaluminum and tri-iso-butylaluminum.

51. A composition as defined in claim 1 wherein said aluminum hydrocarbyl is treated with said electron donor compound by suspending it alone or in the presence of an inert liquid hydrocarbon carrier for about 10 minutes to about six hours at a temperature of about 25° to about 150° C.

52. A composition as defined in claim 1 wherein said aluminum hydrocarbyl is treated with said electron donor compound by suspending it alone or in the presence of an inert liquid hydrocarbon carrier for about 0.5 to about four hours at a temperature of about 50° to about 100° C.

53. A composition as defined in claim 2 wherein said aluminum hydrocarbyl is treated with said electron donor compound by suspending it alone or in the presence of an inert liquid hydrocarbon carrier for about 10 minutes to about six hours at a temperature of about 25° to about 150° C.

54. A composition as defined in claim 2 wherein said aluminum hydrocarbyl is treated with said electron donor compound by suspending it alone or in the presence of an inert liquid hydrocarbon carrier for about 0.5 to about four hours at a temperature of about 50° to about 100° C.

55. A composition as defined in claim 4 wherein said aluminum hydrocarbyl is treated with said electron donor compound by suspending it alone or in the presence of an inert liquid hydrocarbon carrier for about 10 minutes to about six hours at a temperature of about 25° to about 150° C.

56. A composition as defined in claim 4 wherein said aluminum hydrocarbyl is treated with said electron donor compound by suspending it alone or in the presence of an inert liquid hydrocarbon carrier for about 0.5 to about four hours at a temperature of about 50° to about 100° C.

57. A composition as defined in claim 6 wherein said aluminum hydrocarbyl is treated with said electron donor compound by suspending it alone or in the presence of an inert liquid hydrocarbon carrier for about 10 minutes to about six hours at a temperature of about 25° to about 150° C.

58. A composition as defined in claim 6 wherein said aluminum hydrocarbyl is treated with said electron donor compound by suspending it alone or in the presence of an inert liquid hydrocarbon carrier for about 0.5 to about four hours at a temperature of about 50° to about 100° C.

* * * * *

UNITED STATES PATENT AND TRADEMARK OFFICE
CERTIFICATE OF CORRECTION

PATENT NO. : 4,328,123
DATED : May 4, 1982
INVENTOR(S) : David L. Beach and Adolfo Zambelli It is certified that error appears in the above-identified patent and that said Letters Patent are hereby corrected as shown below:

Column 3, line 65, "$XAlR'_2Cl$" should read --$XAlR''_2Cl$--.

Column 4, line 8, "$MgR''_2$" should read --$MgR'_2$--.

Column 5, line 20, "0.03" should read -- 0.3 --.

Column 6, line 46, after "vacuum", insert --.--.

Signed and Sealed this

Twenth-eighth Day of September 1982

[SEAL]

Attest:

GERALD J. MOSSINGHOFF

*Attesting Officer*   *Commissioner of Patents and Trademarks*